United States Patent
Okaniwa et al.

(10) Patent No.: US 9,637,392 B2
(45) Date of Patent: May 2, 2017

(54) SILICOALUMINOPHOSPHATE, METHOD FOR PRODUCING THE SAME, AND SOLID ACID CATALYST COMPRISING THE SAME

(71) Applicant: TOSOH CORPORATION, Yamaguchi (JP)

(72) Inventors: Hiroshi Okaniwa, Yamaguchi (JP); Hidekazu Aoyama, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 239 days.

(21) Appl. No.: 14/403,013

(22) PCT Filed: May 23, 2013

(86) PCT No.: PCT/JP2013/064392
§ 371 (c)(1),
(2) Date: Nov. 21, 2014

(87) PCT Pub. No.: WO2013/176227
PCT Pub. Date: Nov. 28, 2013

(65) Prior Publication Data
US 2015/0151979 A1    Jun. 4, 2015

(30) Foreign Application Priority Data

May 24, 2012 (JP) .................... 2012-119091
Jun. 14, 2012 (JP) .................... 2012-135093
Dec. 25, 2012 (JP) .................... 2012-281674

(51) Int. Cl.
*C01B 39/54* (2006.01)
*B01J 29/85* (2006.01)
(Continued)

(52) U.S. Cl.
CPC ............. *C01B 39/54* (2013.01); *B01J 29/85* (2013.01); *B01J 35/023* (2013.01); *B01J 37/08* (2013.01); *B01J 29/80* (2013.01); *C01B 39/023* (2013.01)

(58) Field of Classification Search
CPC ........ C01B 39/023; C01B 39/54; B01J 29/80; B01J 29/85
See application file for complete search history.

(56) References Cited

U.S. PATENT DOCUMENTS 6,334,994 B1     1/2002  Wendelbo et al.
2002/0165089 A1*  11/2002  Janssen ................ B01J 29/005
                                                       502/214
(Continued)

FOREIGN PATENT DOCUMENTS

EP      0146384 A2    6/1985
JP      59-217619 A   12/1984
(Continued)

OTHER PUBLICATIONS

Briend, et al.; "Influence of the Choice of the Template on the Short- and Long-Term Stability of SAPO-34 Zeolite", Journal of Physical Chemistry, Feb. 1995, vol. 99, No. 20, 7 pages total.
(Continued)

*Primary Examiner* — David M Brunsman
(74) *Attorney, Agent, or Firm* — Sughrue Mion, PLLC

(57) ABSTRACT

The present invention relates to a silicoaluminophosphate represented by the following formula (1) and having a powder X-ray diffraction pattern shown in Table 1 below:

$$(Si_xAl_yP_z)O_2 \quad (1)$$

wherein x is the molar fraction of Si and $0.05 < x \leq 0.15$; y is the molar fraction of Al and $0.47 \leq y \leq 0.52$; z is the molar fraction of P and $0.40 \leq z \leq 0.46$; and $x+y+z=1$;

(Continued)

TABLE 1

| Interplanar Spacing Å | Relative Intensity $I/I_0$ | |
|---|---|---|
| 9.30 ± 0.15 | 1000 | |
| 6.85 ± 0.10 | from 100 to 300 | |
| 6.60 ± 0.10 | from 10 to 100 | B |
| 5.50 ± 0.10 | from 50 to 300 | |
| 5.24 ± 0.10 | from 10 to 100 | B |
| 4.64 ± 0.10 | from 10 to 100 | |
| 4.29 ± 0.05 | from 100 to 500 | |
| 4.17 ± 0.05 | from 10 to 150 | B |
| 3.82 ± 0.05 | from 10 to 100 | |
| 3.42 ± 0.05 | from 20 to 150 | |
| 2.87 ± 0.02 | from 20 to 200 | |

$I/I_0$ is the relative intensity when the peak of 9.30 ± 0.15 Å is taken as 1,000; and B indicates a broad peak.

7 Claims, 1 Drawing Sheet

(51) Int. Cl.
  *B01J 35/02* (2006.01)
  *B01J 37/08* (2006.01)
  *C01B 39/02* (2006.01)
  *B01J 29/80* (2006.01)

(56) References Cited

U.S. PATENT DOCUMENTS

2006/0100095 A1   5/2006   Mertens et al.
2009/0238745 A1   9/2009   Mertens
2010/0196262 A1   8/2010   Xu et al.

FOREIGN PATENT DOCUMENTS

| JP | 03-503881 A | 8/1991 |
| JP | 03-072010 B2 | 11/1991 |
| JP | 4299002 B2 | 7/2009 |
| JP | 2009-538810 A | 11/2009 |
| WO | 03/040037 A1 | 5/2003 |
| WO | 2011/112949 A1 | 9/2011 |

OTHER PUBLICATIONS

Fan, et al.; "A Novel Solvothermal Approach to Synthesize SAPO Molecular Sieves Using Organic Amines as the Solvent and Template", Journal of Materials Chemistry, Apr. 2012, vol. 22, No. 14, 8 pages total.

Liu, et al.; "Synthesis of SAPO-34 Molecular Sieves Templated with Diethylamine and Their Properties Compared with Other Templates", Chinese Journal of Catalysis, Jan. 2012, vol. 33, Issue 1, 7 pages total.

Search Report dated Aug. 20, 2013, issued by the International Searching Authority in counterpart International Application No. PCT/JP2013/064392.

Written Opinion dated Aug. 20, 2013, issued by the International Searching Authority in counterpart International Application No. PCT/JP2013/064392.

\* cited by examiner

INTENSITY

SILICOALUMINOPHOSPHATE, METHOD FOR PRODUCING THE SAME, AND SOLID ACID CATALYST COMPRISING THE SAME

TECHNICAL FIELD

The present invention relates to a novel silicoaluminophosphate, a production method thereof, and a solid acid catalyst containing the silicoaluminophosphate. More specifically, the present invention relates to a novel silicoaluminophosphate having high water resistance allowing only a small decrease in the solid acidity even when exposed to a water-containing atmosphere, a production method thereof, and a solid acid catalyst containing the silicoaluminophosphate.

BACKGROUND ART

Crystalline silicoaluminophosphates having various pore structures have been proposed mainly by the researchers of Union Carbide Corporation (see, for example, Patent Document 1). Among others, SAPO-34 is recently attracting attention as a solid acid catalyst used for the synthesis, etc. of an olefin from a bio-alcohol that is a hydrocarbon resource substituting for petroleum.

However, when SAPO-34 is left in a water-containing atmosphere, its crystallinity decreases with time (see, for example, Non-Patent Document 1).

The crystalline silicoaluminophosphate decreases in its crystallinity with time when left in a water-containing atmosphere. In addition, the crystalline silicoaluminophosphate has a problem that the solid acidity is reduced as the crystallinity decreases due to hydration and unless special storage management blocked from the atmosphere is treated, SAPO-34 deteriorates during storage.

Other silicoaluminophosphates having a crystal structure different from that of SAPO-34 have been proposed as a solid acid catalyst for the synthesis of an olefin from an alcohol (see, for example, Patent Document 2).

These crystalline silicoaluminophosphates are characterized by the composition (($Si_xAl_yP_z$)$O_2$, wherein x: from 0.01 to 0.05, y and z: from 0.4 to 0.6) and the powder X-ray diffraction pattern. In addition, their associated silicoaluminophosphates have also been proposed (see, for example, Patent Document 3). These silicoaluminophosphates are characterized by the further different composition ($SiO_2$/$Al_2O_3$ molar ratio: from 0.01 to 0.25) and the powder X-ray diffraction pattern.

However, all of these silicoaluminophosphates contain a very small amount of Si. A silicoaluminophosphate having a small Si amount has a problem that the amount of solid acid contained is small and when used for a solid acid catalyst, etc., the catalytic activity is low.

Recently, it has also been reported to use, as a catalyst, a novel silicoaluminophosphate composed of an intergrowth where a part of the CHA structure of SAPO-34 and a part of the AEI structure of SAPO-18 are complicatedly laminated (see, Patent Document 4). In this report, the intergrowth is proved to be a crystal different from SAPO-34 or SAPO-18 by X-ray crystal diffraction in combination with simulation results. Meanwhile, a crystal is specified by the ratio between AEI and CHA on the assumption, for descriptive purposes, that the crystal is a laminate of CHA structure and AEI structure, and specifically, a crystal having a CHA/AEI ratio of 90:10 is described.

BACKGROUND ART DOCUMENT

Patent Document

Patent Document 1: JP-B-3-72010 (the term "JP-B" as used herein means an "examined Japanese patent publication")
Patent Document 2: U.S. Pat. No. 6,334,994
Patent Document 3: Japanese Patent No. 4,299,002
Patent Document 4: International Publication No. 2011/112949, pamphlet

Non-Patent Document

Non-Patent Document 1: Journal of Physical Chemistry, 1995, Vol. 99, pp. 8270-8276

SUMMARY OF INVENTION

Problem that Invention is to Solve

An object of the present invention is to provide a novel crystalline silicoaluminophosphate having high water resistance allowing only a small decrease in the solid acidity even when stored or used in the active state as a solid acid catalyst in a water-containing atmosphere, a production method thereof, and a solid acid catalyst containing the silicoaluminophosphate.

Means for Solving Problem

The present inventors have made intensive studies while taking into account the above-described object. As a result, it has been found that a silicoaluminophosphate represented by the following formula (1) and having a powder X-ray diffraction (hereinafter, referred to as "XRD") pattern shown in Table 1 has significantly high water resistance. The present invention has been accomplished based on this finding.

$$(Si_xAl_yP_z)O_2 \qquad (1)$$

(wherein x is the molar fraction of Si and $0.05 < x \le 0.15$; y is the molar fraction of Al and $0.47 \le y \le 0.52$; z is the molar fraction of P and $0.40 \le z \le 0.46$; and $x+y+z=1$).

TABLE 1

| Interplanar Spacing Å | Relative Intensity $I/I_0$ | |
|---|---|---|
| 9.30 ± 0.15 | 1000 | |
| 6.85 ± 0.10 | from 100 to 300 | |
| 6.60 ± 0.10 | from 10 to 100 | B |
| 5.50 ± 0.10 | from 50 to 300 | |
| 5.24 ± 0.10 | from 10 to 100 | B |
| 4.64 ± 0.10 | from 10 to 100 | |
| 4.29 ± 0.05 | from 100 to 500 | |
| 4.17 ± 0.05 | from 10 to 150 | B |
| 3.82 ± 0.05 | from 10 to 100 | |
| 3.42 ± 0.05 | from 20 to 150 | |
| 2.87 ± 0.02 | from 20 to 200 | |

$I/I_0$ is the relative intensity when the peak of 9.30 ± 0.15 Å is taken as 1,000; and B indicates a broad peak.

That is, the gist of the present invention resides in the followings.

(1) A silicoaluminophosphate represented by the following formula (1) and having a powder X-ray diffraction pattern shown in Table 1 below:

$$(Si_xAl_yP_z)O_2 \qquad (1)$$

(wherein x is a molar fraction of Si and 0.05<x≤0.15; y is a molar fraction of Al and 0.47≤y≤0.52; z is a molar fraction of P and 0.40≤z≤0.46; and x+y+z=1);

TABLE 1

| Interplanar Spacing Å | Relative Intensity I/I₀ | |
|---|---|---|
| 9.30 ± 0.15 | 1000 | |
| 6.85 ± 0.10 | from 100 to 300 | |
| 6.60 ± 0.10 | from 10 to 100 | B |
| 5.50 ± 0.10 | from 50 to 300 | |
| 5.24 ± 0.10 | from 10 to 100 | B |
| 4.64 ± 0.10 | from 10 to 100 | |
| 4.29 ± 0.05 | from 100 to 500 | |
| 4.17 ± 0.05 | from 10 to 150 | B |
| 3.82 ± 0.05 | from 10 to 100 | |
| 3.42 ± 0.05 | from 20 to 150 | |
| 2.87 ± 0.02 | from 20 to 200 | |

$I/I_0$ is a relative intensity when the peak of 9.30 ± 0.15 Å is taken as 1,000; and B indicates a broad peak.

(2) The silicoaluminophosphate as described in (1) above, wherein an average crystal size is from 0.5 to 10 μm.

(3) The silicoaluminophosphate as described in (1) or (2) above, wherein a solid acidity of a crystal is 0.5 mmol/g or more.

(4) The silicoaluminophosphate as described in any one of (1) to (3) above, comprising:

a crystal in which an intergrowth ratio of CHA structure and AEI structure is from 50/50 to 30/70 in terms of CHA/AEI ratio.

(5) The silicoaluminophosphate as described in any one of (1) to (4) above, wherein a solid acidity of at least 50% is retained after a crystal in a hydrogen-type state resulting from removal of a structure directing agent is stored in saturated water vapor at 80° C. for 8 days.

(6) A method for producing the silicoaluminophosphate described in any one of (1) to (5) above, comprising:

mixing a silicon source, a phosphorus source, an aluminum source, water and a structure directing agent to prepare a reaction mixture having, when expressed by molar ratios of oxides, the following molar compositional ratio:

| | |
|---|---|
| $P_2O_5/Al_2O_3$ | from 0.7 to 1.5, |
| $SiO_2/Al_2O_3$ | from 0.1 to 1.2, |
| $H_2O/Al_2O_3$ | from 5 to 100, and |
| $R/Al_2O_3$ | from 0.5 to 5 |

(R represents a structure directing agent); and holding the reaction mixture at a temperature of from more than 160° C. to 220° C. for 5 to 100 hours.

(7) The method for production the silicoaluminophosphate as described in (6) above, wherein the structure directing agent is triethylamine or a mixture of triethylamine and other alkylamine or an ammonium salt thereof.

(8) The method for producing the silicoaluminophosphate as described in (6) or (7) above, wherein the silicoaluminophosphate described in any one of (1) to (5) is added as a seed crystal to the reaction mixture in a ratio of 0.05 to 10 wt % relative to a total weight of the silicon source, the phosphorus source and the aluminum source in the reaction mixture when the amounts are converted in terms of oxides ($SiO_2$, $P_2O_5$, $Al_2O_3$).

(9) A solid acid catalyst, comprising:
the silicoaluminophosphate according to any one of (1) to (5) above.

Effects of Invention

The silicoaluminophosphate of the present invention has high water resistance allowing only a small decrease in the solid acidity even when stored or used in the active state as a solid acid catalyst in a water-containing atmosphere.

MODE FOR CARRYING OUT INVENTION

Figure 1:
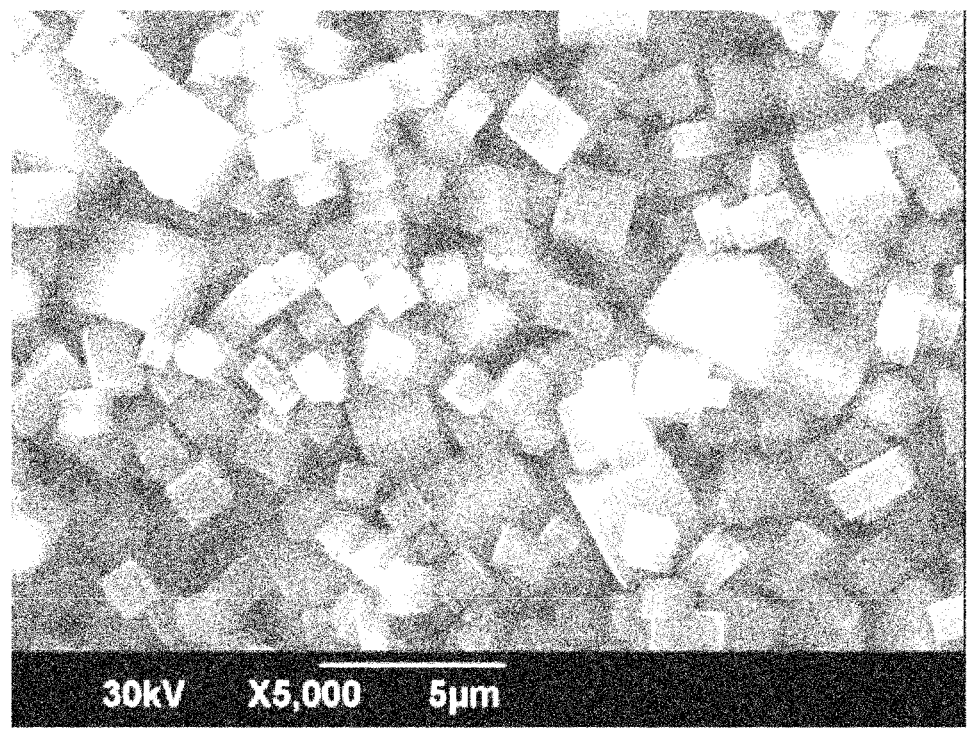
FIG. 1 A drawing depicting an SEM photograph at a magnification of 5,000 times of a crystal of the silicoaluminophosphate obtained in Example 3 (in the Figure, the scale is 5 μm).

The silicoaluminophosphate of the present invention is described in detail below.

The silicoaluminophosphate of the present invention has, in formula (1), a molar fraction of Si, i.e., an Si content, in the range of 0.05<x≤0.15. The solid acidity of the silicoaluminophosphate depends on the Si content thereof. If the molar fraction x of Si is 0.05 or less, the solid acidity is small and, for example, in the case of using this silicoaluminophosphate as a solid acid catalyst, the catalytic function of the catalyst becomes insufficient. On the other hand, if x exceeds 0.15, even when the crystallinity is equal to that of the silicoaluminophosphate of the present invention, the water resistance is not sufficient and therefore, when this silicoaluminophosphate is stored in a water-containing atmosphere, reduction in the crystallinity and solid acidity occurs.

For this reason, the molar fraction of Si is in the range of 0.05<x≤0.15, preferably 0.05<x≤0.13, more preferably 0.05<x≤0.10, still more preferably 0.07≤x≤0.15, yet still more preferably 0.07≤x≤0.13, even yet still more preferably 0.07≤x≤0.10. The silicoaluminophosphate of the present invention has a molar fraction of Si in the range above and therefore, the Si content is larger than, for example, the Si content of the silicoaluminophosphate described in U.S. Pat. No. 6,334,994 (Patent Document 2).

The molar fraction of P is 0.40≤z≤0.46. If z is less than 0.40, the water resistance is likely to be reduced. If z exceeds 0.46, the water resistance may be high, but a silicoaluminophosphate having a small solid acidity results and in the case of using this silicoaluminophosphate as a solid acid catalyst, the catalytic function of the catalyst may be insufficient.

The silicoaluminophosphate of the present invention preferably has, in the hydrogen-type state resulting from removal of a structure directing agent, an XRD pattern shown in Table 1, i.e., has all XRD peaks (hereinafter, sometimes simply "peak") shown in the XRD pattern of Table 1. The "hydrogen-type state" is a state where the cation at the ion exchange site of the silicoaluminophosphate is substantially only a proton ($H^+$).

This XRD pattern has an XRD peak that is not present in the XRD pattern of SAPO-34 silicoaluminophosphate, i.e., has a broad peak around an interplanar spacing of 6.60 Å (diffraction angle 2θ=around 13.4°), around 5.24 Å (diffraction angle 2θ=around 16.9°) and around 4.17 Å (diffraction angle 2θ=around 21.3°). Here, the broad peak is an XRD peak having a half-width value of 0.3° or more. In addition, the silicoaluminophosphate of the present invention does not have an XRD peak that is possessed by SAPO-34 silicoaluminophosphate, i.e., does not have a peak around an interplanar spacing of 4.96 Å (diffraction angle 2θ=around 17.9°) and an XRD peak around 3.54 Å (diffraction angle 2θ=around 25.1°), or the peaks are extremely small.

In the present invention, the diffraction angle 2θ is an angle in an XRD pattern when copper Kα is used for the ray source.

Furthermore, in the XRD pattern of the silicoaluminophosphate of the present invention, the peak intensity at 5.24 Å relative to the peak intensity at an internal spacing of 4.29 Å (hereinafter, referred to as "relative peak intensity ratio") is 100% or less. Also, the relative peak intensity ratio of the silicoaluminophosphate of the present invention is 5% or more, 7% or more, 10% or more, or 20% or more.

When compared with the XRD pattern of the specific silicoaluminophosphate described in U.S. Pat. No. 6,334,994, the silicoaluminophosphate of the present invention does not have a peak at an interplanar spacing of 8.3 to 8.5 Å (diffraction angle 2θ=around 10.6°), which is a peak referred to in U.S. Pat. No. 6,334,994.

In addition, when compared with the silicoaluminophosphate molecular sieve described in Japanese Patent No. 4,299,002 (Patent Document 3), which has been reported as another specific silicoaluminophosphate, the silicoaluminophosphate of the present invention has an XRD pattern different therefrom. More specifically, the XRD pattern of the silicoaluminophosphate of the present invention has peaks around an interplanar spacing of 5.24 Å (diffraction angle 2θ=around 16.9°) and around an interplanar spacing of 4.17 Å (diffraction angle 2θ=around 21.3°), which are peaks not present in the XRD pattern of Japanese Patent No. 4,299,002. Accordingly, the structure of the silicoaluminophosphate of the present invention is also utterly different from that of the silicoaluminophosphate molecular sieve described in Japanese Patent No. 4,299,002.

In the silicoaluminophosphate of the present invention, the average crystal size is preferably from 0.5 to 10 μm, more preferably from 1 to 5 μm.

The "average crystal size" as used in the present invention is a value observed by a scanning electron microscope (hereinafter, referred to as "SEM") and is an average value of crystal size of so-called primary particles, i.e., minimum independent particles observable by SEM. Therefore, the average crystal size differs from the so-called aggregate particle size, i.e., the average particle size of secondary particles formed by aggregation of primary particles. As for the average crystal size, for example, the value was obtained by measuring the crystal size of arbitrary 100 or more crystals and averaging the measured values may be used.

When the crystal has an average size of 0.5 μm or more, the heat resistance tends to become high. On the other hand, when the average crystal size is 10 μm or less, the diffusion rate of a substance in the crystal of the silicoaluminophosphate can be hardly lowered and therefore, for example, in the case of using the silicoaluminophosphate of the present invention as a solid acid catalyst, the reaction rate is less likely to be lowered, making it possible to prevent an increase in the byproduct content.

In the silicoaluminophosphate of the present invention, the solid acidity is preferably 0.5 mmol/g or more, more preferably 0.6 mmol/g or more, still more preferably 0.7 mmol/g or more.

The solid acidity is quantitatively determined by a general $NH_3$-TPD method. In the silicoaluminophosphate of the present invention, due to its Si content, the solid acidity tends to be from 0.5 to 1.4 mmol/g.

The silicoaluminophosphate of the present invention has high water resistance. Therefore, even when the silicoaluminophosphate is stored in a water-containing environment, the decrease in the solid acidity between before and after the storage is small. For example, even when the silicoaluminophosphate of the present invention is stored in saturated water vapor at 80° C. for 8 days, the ratio of the solid acidity of the silicoaluminophosphate after storage to the solid acidity of the silicoaluminophosphate before storage (hereinafter, referred to as "solid acid retention percentage") is at least 50%, at least 60%, or at least 63%. As the solid acid retention percentage is higher, the water resistance is higher.

In relation to the ratio between AEI and CHA on the assumption, for descriptive purposes, that the crystal is a laminate of CHA structure and AEI structure, the silicoaluminophosphate of the present invention is preferably a crystal where the intergrowth ratio between CHA structure and AEI structure (hereinafter, sometimes simply referred to as "intergrowth ratio") is from 50/50 to 30/70 in terms of CHA/AEI ratio. The intergrowth ratio includes, for example, in terms of CHA/AEI ratio, 50/50, 45/55, 40/60, 35/65, and 30/70.

If the CHA/AEI ratio is an AEI richer ratio than 30/70, the solid acidity is likely to decrease. On the other hand, if the CHA/AEI ratio is a CHA richer ratio than 50/50, the water resistance of the silicoaluminophosphate is reduced.

The production method of the silicoaluminophosphate of the present invention is described below. The silicoaluminophosphate of the present invention can be produced by mixing a silicon source, a phosphorus source, an aluminum source, water and a structure directing agent to prepare a reaction mixture having, when expressed by the molar ratios of oxides, the following molar compositional ratio, and holding the reaction mixture at a temperature of from more than 160° C. to 220° C. for 5 to 100 hours:

| | |
|---|---|
| $P_2O_5/Al_2O_3$ | from 0.7 to 1.5, |
| $SiO_2/Al_2O_3$ | from 0.1 to 1.2, |
| $H_2O/Al_2O_3$ | from 5 to 100, and |
| $R/Al_2O_3$ | from 0.5 to 5 |

(R represents a structure directing agent).

The silicon source for use in the production of the silicoaluminophosphate of the present invention is not particularly limited. As the silicon source, for example, a silicon source that is water-soluble or dispersed in water, such as colloidal silica, silica sol and water glass, a solid silicon source such as amorphous silica, fumed silica and sodium silicate, and an organic silicon source such as ethyl orthosilicate, can be used.

The phosphorus source for use in the production of the silicoaluminophosphate of the present invention is not particularly limited. As the phosphorus source, a water-soluble phosphorus source such as orthophosphoric acid and phosphorous acid, and a solid phosphorus source such as condensed phosphoric acid, e.g., pyrophosphoric acid, and calcium phosphate, can be used.

The aluminum source for use in the production of the silicoaluminophosphate of the present invention is not particularly limited. As the aluminum source, for example, an aluminum source that is water-soluble or dispersed in water, such as aluminum sulfate solution, sodium aluminate solution and alumina sol, a solid aluminum source such as amorphous alumina, pseudo-boehmite, boehmite, aluminum hydroxide, aluminum sulfate and sodium aluminate, and an organic aluminum source such as aluminum isopropoxide, can be used.

The structure directing agent for use in the production of the silicoaluminophosphate of the present invention is not particularly limited. As the structure directing agent, for example, a tertiary amine, furthermore, at least one tertiary amine selected from the group consisting of triethylamine, methyldiethylamine, diethylpropylamine, ethyldipropylamine and diethylisopropylamine, can be used. Among these, triethylamine is preferred as the structure directing agent.

In addition, a mixture of triethylamine with a tertiary amine except for triethylamine or with other structure directing agent employed in the synthesis of silicoaluminophosphate may also be used. The other structure directing agent used in the synthesis of silicoaluminophosphate includes, for example, any one or more members of alkylamines and ammonium salts thereof and further includes at least one member selected from the group consisting of tetraethylammonium salt, diethylamine, methylbutylamine, morpholine, cyclohexylamine and propylamine, and an ammonium salt thereof.

The order of adding these silicon source, phosphorus source, aluminum source, water and structure directing agent is not particularly limited. Therefore, a reaction mixture may be prepared by adding and mixing these raw materials individually or by adding and mixing two or more raw materials simultaneously. Furthermore, a previously prepared amorphous aluminophosphate gel may be used as the phosphorus source and aluminum source, and an amorphous silicoaluminophosphate gel may be used as the silicon source, aluminum source and phosphorus source. The reaction mixture can be prepared by previously preparing such a material containing two or more raw materials, and adding and mixing the material above with water, a structure directing agent and, if desired, a silicon source, a phosphorus source and aluminum source.

If desired, the pH of the reaction mixture may be adjusted using an acid such as hydrochloric acid, sulfuric acid or hydrofluoric acid, or an alkali such as sodium hydroxide, potassium hydroxide or ammonium hydroxide.

The phosphorus source and the aluminum source are mixed such that the $P_2O_5/Al_2O_3$ molar ratio in terms of oxide becomes from 0.7 to 1.5. When the $P_2O_5/Al_2O_3$ molar ratio is 0.7 or more, the yield is less likely to decrease, which is economical. On the other hand, when the $P_2O_5/Al_2O_3$ is 1.5 or less, the crystallization rate is not lowered, and the crystallization does not require a long time. The $P_2O_5/Al_2O_3$ molar ratio is preferably from 0.8 to 1.2.

The silicon source and the aluminum source are mixed such that the $SiO_2/Al_2O_3$ molar ratio in terms of oxide becomes from 0.1 to 1.2. When the $SiO_2/Al_2O_3$ molar ratio is 0.1 or more, the Si content in the silicoaluminophosphate produced is difficult to decrease and in turn, the solid acidity is less likely to become insufficient. When the $SiO_2/Al_2O_3$ molar ratio is 1.2 or less, the crystallization rate hardly drops and therefore, the crystallization does not require a long time. The $SiO_2/Al_2O_3$ molar ratio is preferably from 0.2 to 0.8.

Water and the aluminum source are mixed such that the $H_2O/Al_2O_3$ molar ratio in terms of oxide becomes from 5 to 100. At this time, in the case of using, as the raw material, an aqueous solution of colloidal silica or phosphoric acid, the amount of water in the aqueous solution must be taken into account. Since the amount of water affects the yield of a product, the $H_2O/Al_2O_3$ molar ratio is preferably smaller. When the $H_2O/Al_2O_3$ molar ratio is 5 or more, the viscosity of the reaction mixture is not raised and the preparation of the reaction mixture is facilitated. The $H_2O/Al_2O_3$ molar ratio is preferably from 10 to 100, more preferably from 15 to 50.

The structure directing agent (R) and the aluminum source are mixed such that the $R/Al_2O_3$ molar ratio in terms of oxide becomes from 0.5 to 5. The structure directing agent undertakes an important role in forming the crystal structure of the silicoaluminophosphate of the present invention. Therefore, the $R/Al_2O_3$ molar ratio is preferably larger. If the $R/Al_2O_3$ molar ratio is less than 0.5, the silicoaluminophosphate of the present invention cannot be obtained. On the other hand, even if the structure directing agent is added in such an amount that the $R/Al_2O_3$ molar ratio exceeds 5, the impact on the structure formation effect is small. The $R/Al_2O_3$ molar ratio is preferably from 1 to 3.

When producing the silicoaluminophosphate of the present invention, the silicoaluminophosphate of the present invention may be added as a seed crystal in an amount of 0.05 to 10 wt % to the reaction mixture. By this addition, not only the crystallization time tends to be shortened but also the crystal size likely becomes uniform. At this time, it is more effective that the silicoaluminophosphate of the present invention as a seed crystal is milled and then used. Here, the amount added of the seed crystal is wt % relative to the total weight of the silicon source, phosphorus source and aluminum source in the reaction mixture when their amounts are converted in terms of oxides ($SiO_2$, $P_2O_5$, $Al_2O_3$). If the amount added of the seed crystal is less than 0.05 wt %, the effect such as shortening of the crystallization time or uniformization of the crystal size may be insufficient. On the other hand, the upper limit of the amount added is not particularly limited, but when it is an amount more than 10 wt %, a sufficient effect is obtained by the addition of the seed crystal. The amount added of the seed crystal is preferably from 0.05 to 10 wt %, more preferably from 0.1 to 5 wt %.

The thus-prepared reaction mixture is put in a sealed pressure vessel and held at a temperature of from more than 160° C. to 220° C. for 5 to 100 hours, whereby the silicoaluminophosphate of the present invention can be produced. In order to make the product composition or crystal size uniform, stirring is preferably performed during heating. If the crystallization temperature is too low, the crystallization requires a long time. On the other hand, when the crystallization temperature is high, crystallization can be achieved in a short time. The crystallization temperature is preferably from 170 to 200° C.

The thus-crystallized silicoaluminophosphate of the present invention is separated from the crystallization mother liquid by a conventional solid-liquid separation method such as filtration, decantation and centrifugal separation, then, if desired, washed with water, thereafter, dried by a conventional method, and recovered.

The thus-recovered silicoaluminophosphate in the dry state contains, in pores, the structure directing agent used for crystallization. For using the silicoaluminophosphate as a solid acid catalyst or a catalyst support, the structure directing agent contained may be removed by calcination. The structure directing agent can be removed by calcining the silicoaluminophosphate at a temperature of 400 to 800° C. in an oxygen-containing atmosphere. At this time, when calcination is performed in an atmosphere having a high oxygen concentration, the structure directing agent burns violently, as a result, the structure of the silicoaluminophosphate may collapse or the temperature in the firing furnace may be greatly changed. In such a case, the atmosphere is preferably set at the initial stage to a low oxygen atmosphere or an oxygen-free atmosphere to suppress the burning of the structure directing agent.

The silicoaluminophosphate obtained in this way sometimes contains, at the ion exchange site, a metal cation in a raw material such as alkali metal and alkaline earth metal, depending on the raw material used. Therefore, if desired, acid washing or ion exchanging may be performed to remove the metal cation or incorporate a desired metal cation.

EXAMPLES

The present invention is described in greater detail below, but the present invention is not limited to these Examples.
(Measurement of Solid Acidity by $NH_3$-TPD Method)

A fixed-bed normal-pressure flow-type reaction tube was filled with 0.1 g of a sample regulated to a particle size of 20 to 30 meshes by crushing the pressure molded sample, and the sample was pre-treated at 500° C. for 1 hour under helium flow, and cooled to 100° C. While keeping at 100° C., the sample was put into contact with a gas of 10 vol % ammonia and balance helium at a flow rate of 60 ml/min for 1 hour to adsorb ammonia and then put into contact with a helium gas at a flow rate of 60 ml/min for 1 hour to purge the ammonia gas. Thereafter, while putting the sample into contact with a helium gas at a flow rate of 60 ml/min, the temperature was raised to 700° C. at a temperature rising rate of 10° C./min. The ammonia concentration in the gas flowed through the sample was quantitatively analyzed continuously by a gas chromatograph equipped with thermal conductivity detector (TCD), and the solid acid properties were evaluated by the desorption spectrum of ammonia.

In the quantitative determination of the solid acidity, the solid acidity (mmol/g) per weight of the crystalline silicoaluminophosphate was calculated from the ratio between the ammonia desorption amount forming a desorption peak having an apex at 300° C. or more on the ammonia desorption spectrum and the weight of the sample.
(Ratio of AEI and CHA)

For descriptive purposes, on the assumption that the crystal is a laminate of CHA structure and AEI structure, the ratio of AEI and CHA was determined by comparison with XRD simulated patterns using the DIFFaX program (v1.813) distributed by International Zeolite Association.

Example 1

A reaction mixture having the following composition was prepared by mixing 1,690 g of water, 559 g of an aqueous 85% phosphoric acid solution (Kishida Chemical Co., Ltd.; guaranteed reagent), 284 g of 30% colloidal silica (Nissan Chemical Industries, Ltd.; ST-N30), 744 g of triethylamine (Kishida Chemical Co., Ltd.; guaranteed reagent), and 322 g of 77% pseudo-boehmite (Sasol; Pural SB).
 $P_2O_5/Al_2O_3=1.0$
 $SiO_2/Al_2O_3=0.6$
 $H_2O/Al_2O_3=50$
 $TEA/Al_2O_3=3$
(TEA represents triethylamine.)
This reaction mixture was put in a 4,000-mL stainless steel-made sealed pressure vessel and held at 180° C. for 69 hours with stirring at 270 rpm to obtain the silicoaluminophosphate of this Example.

The obtained silicoaluminophosphate was filtered, washed with water, dried at 110° C. overnight and then calcined at 600° C. for 2 hours to form a hydrogen type.

Figure 2:
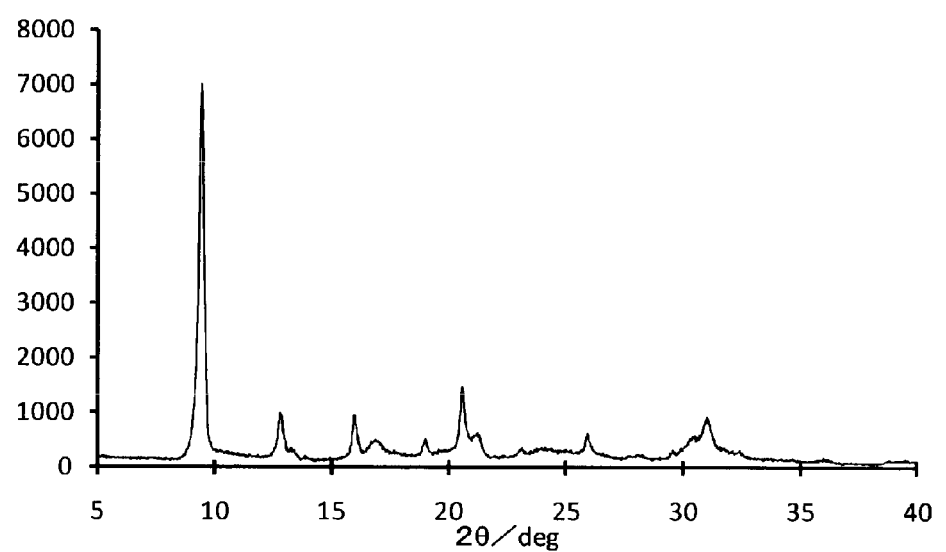
FIG. 2 A drawing depicting an XRD pattern of the silicoaluminophosphate obtained in Example 1.

The resulting silicoaluminophosphate of a hydrogen type was measured for the interplanar spacing by using a powder X-ray diffractometer (Mac Science; MPX3) employing a copper Kα ray as the ray source. FIG. 2 depicts the XRD pattern. In addition, the interplanar spacing (d value) at a peak position of the XRD pattern and the relative intensity of the peak are shown in Table 2 (in the Table, only diffraction peaks with a relative intensity of 2% or more are shown).

TABLE 2

| Interplanar Spacing Å | Relative Intensity I/I$_0$ | |
|---|---|---|
| 9.30 | 1000 | |
| 6.84 | 214 | |
| 6.60 | 36 | B |
| 5.49 | 166 | |
| 5.22 | 49 | B |
| 4.97 | 22 | |
| 4.63 | 48 | |
| 4.28 | 276 | |
| 4.14 | 65 | B |
| 3.82 | 48 | |
| 3.69 | 20 | B |
| 3.54 | 23 | |
| 3.41 | 90 | |
| 3.15 | 21 | |
| 2.89 | 90 | B |
| 2.86 | 131 | |

B indicates a broad peak.

As shown in Table 2, a peak at an interplanar spacing of 8.3-8.5 Å (diffraction angle 2θ=around 10.6°) is not present, and the product has a broad peak around an interplanar spacing of 5.24 Å (diffraction angle 2θ=around 16.9°) and thus exhibited the characteristics of the silicoaluminophosphate of the present invention. The relative peak intensity ratio was 17.8%.

The silicoaluminophosphate after drying was analyzed by an inductively coupled plasma emission analyzer (ICP) and found to have the following composition in terms of oxide:

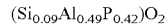

$(Si_{0.09}Al_{0.49}P_{0.42})O_2$

The silicoaluminophosphate after drying was observed by SEM, and the average crystal size of arbitrary 150 crystals was 4.3 μm.

The intergrowth ratio of the silicoaluminophosphate of this Example was 40/60 in terms of CHA/AEI.

Example 2

A reaction mixture having the following composition was prepared by mixing 4.6 g of water, 15.4 g of an aqueous 85% phosphoric acid solution (Kishida Chemical Co., Ltd.; guaranteed reagent), 7.8 g of 30% colloidal silica (Nissan Chemical Industries, Ltd.; ST-N30), 20.3 g of triethylamine (Kishida Chemical Co., Ltd.; guaranteed reagent), and 8.9 g of 77% pseudo-boehmite (Sasol; Pural SB).
 $P_2O_5/Al_2O_3=1.0$
 $SiO_2/Al_2O_3=0.6$
 $H_2O/Al_2O_3=15$
 $TEA/Al_2O_3=3$
This reaction mixture was put in a 80-mL stainless steel-made sealed pressure vessel and held at 180° C. for 62 hours while rotating the vessel around a horizontal axis at 55 rpm to obtain the silicoaluminophosphate of this Example.

The obtained silicoaluminophosphate was filtered, washed with water, dried at 110° C. overnight and then calcined at 600° C. for 2 hours to form a hydrogen type.

An XRD pattern of the resulting silicoaluminophosphate of a hydrogen type was obtained using a powder X-ray diffractometer (Mac Science; MPX3) employing a copper Kα ray as the ray source, and the interplanar spacing (d value) at a peak position and the relative intensity of the peak were determined therefrom and shown in Table 3 (in the Table, only diffraction peaks with a relative intensity of 2% or more are shown).

TABLE 3

| Interplanar Spacing Å | Relative Intensity $I/I_0$ | |
|---|---|---|
| 9.36 | 1000 | |
| 6.89 | 117 | |
| 6.66 | 22 | B |
| 5.53 | 105 | |
| 5.25 | 36 | B |
| 4.67 | 35 | |
| 4.31 | 172 | |
| 4.19 | 52 | B |
| 3.84 | 16 | |
| 3.43 | 51 | |
| 2.93 | 39 | B |
| 2.88 | 86 | |

B indicates a broad peak.

As shown in Table 3, the characteristics of the silicoaluminophosphate of the present invention had the same characteristics of the silicoaluminophosphate of Example 1. The relative peak intensity ratio was 20.9%.

The silicoaluminophosphate after drying was analyzed by an inductively coupled plasma emission analyzer (ICP) and found to have the following composition in terms of oxide:

$(Si_{0.07}Al_{0.49}P_{0.44})O_2$

The product after drying was observed by SEM, and the average crystal size of arbitrary 150 crystals was 3.4 μm.

The intergrowth ratio of the obtained silicoaluminophosphate was 40/60 in terms of CHA/AEI.

Example 3

A reaction mixture having the following composition was prepared by mixing 1,698 g of water, 559 g of an aqueous 85% phosphoric acid solution (Kishida Chemical Co., Ltd.; guaranteed reagent), 284 g of 30% colloidal silica (Nissan Chemical Industries, Ltd.; ST-N30), 736 g of triethylamine (Kishida Chemical Co., Ltd.; guaranteed reagent), 322 g of 77% pseudo-boehmite (Sasol; Pural SB), and 4.2 g of a seed crystal prepared by wet milling the crystalline silicoaluminophosphate obtained in Example 1 in a ball mill for 1 hour.

$P_2O_5/Al_2O_3=1.0$
$SiO_2/Al_2O_3=0.6$
$H_2O/Al_2O_3=50$
$TEA/Al_2O_3=3$
Seed crystal: 0.5 wt %

This reaction mixture was put in a 4,000-mL stainless steel-made sealed pressure vessel and held at 180° C. for 64 hours with stirring at 270 rpm to obtain the silicoaluminophosphate of this Example.

The obtained silicoaluminophosphate was filtered, washed with water, dried at 110° C. overnight and then calcined at 600° C. for 2 hours to form a hydrogen type.

An XRD pattern of the resulting silicoaluminophosphate of a hydrogen type was obtained using an XRD apparatus (Mac Science; MPX3) employing a copper Kα ray as the ray source, and the interplanar spacing (d value) at a peak position and the relative intensity of the peak were determined therefrom and shown in Table 4 (in the Table, only diffraction peaks with a relative intensity of 2% or more are shown).

TABLE 4

| Interplanar Spacing Å | Relative Intensity $I/I_0$ | |
|---|---|---|
| 9.28 | 1000 | |
| 6.82 | 205 | |
| 6.57 | 24 | B |
| 5.49 | 158 | |
| 5.23 | 63 | B |
| 4.95 | 21 | |
| 4.63 | 34 | |
| 4.28 | 287 | |
| 4.16 | 64 | B |
| 3.82 | 42 | |
| 3.7 | 26 | B |
| 3.53 | 35 | |
| 3.41 | 85 | |
| 3.15 | 21 | |
| 2.87 | 126 | |

B indicates a broad peak.

As shown in Table 4, the characteristics of the silicoaluminophosphate of the present invention had the same characteristics of the silicoaluminophosphate of Example 1. The relative peak intensity ratio was 22.0%.

The silicoaluminophosphate after drying was analyzed by an inductively coupled plasma emission analyzer (ICP) and found to have the following composition in terms of oxide:

$(Si_{0.08}Al_{0.50}P_{0.42})O_2$

The silicoaluminophosphate after drying was observed by SEM, and the average crystal size of arbitrary 150 crystals was 1.2 μm. FIG. 1 depicts the SEM photograph at a magnification of 5,000 times.

The intergrowth ratio of the obtained silicoaluminophosphate was 35/65 in terms of CHA/AEI.

Example 4

A reaction mixture having the following composition was prepared by mixing 28.8 g of water, 9.5 g of an aqueous 85% phosphoric acid solution (Kishida Chemical Co., Ltd.; guaranteed reagent), 4.8 g of 30% colloidal silica (Nissan Chemical Industries, Ltd.; ST-N30), 8.3 g of triethylamine (Kishida Chemical Co., Ltd.; guaranteed reagent), 5.5 g of 77% pseudo-boehmite (Sasol; Pural SB), and 0.09 g of a seed crystal prepared by wet milling the crystalline silicoaluminophosphate obtained in Example 1 in a ball mill for 1 hour.

$P_2O_5/Al_2O_3=1.0$
$SiO_2/Al_2O_3=0.6$
$H_2O/Al_2O_3=50$
$TEA/Al_2O_3=2$
Seed crystal: 0.6 wt %

This reaction mixture was put in a 80-mL stainless steel-made sealed pressure vessel and held at 180° C. for 63 hours while rotating the vessel around a horizontal axis at 55 rpm to obtain the silicoaluminophosphate of this Example.

The obtained silicoaluminophosphate was filtered, washed with water, dried at 110° C. overnight and then calcined at 600° C. for 2 hours to form a hydrogen type.

An XRD pattern of the resulting silicoaluminophosphate of a hydrogen type was obtained using an XRD apparatus (Mac Science; MPX3) employing a copper Kα ray as the ray source, and the interplanar spacing (d value) at a peak position and the relative intensity of the peak were determined therefrom. The results are shown in Table 5 (in the Table, only diffraction peaks with a relative intensity of 2% or more are shown).

TABLE 5

| Interplanar Spacing Å | Relative Intensity I/I₀ | |
|---|---|---|
| 9.28 | 1000 | |
| 6.83 | 188 | |
| 6.57 | 22 | B |
| 5.50 | 143 | |
| 5.24 | 69 | B |
| 4.95 | 23 | |
| 4.64 | 31 | |
| 4.28 | 245 | |
| 4.16 | 63 | B |
| 3.83 | 32 | |
| 3.71 | 27 | B |
| 3.54 | 30 | |
| 3.42 | 67 | |
| 2.93 | 34 | B |
| 2.87 | 101 | |

B indicates a broad peak.

As shown in Table 5, the characteristics of the silicoaluminophosphate of the present invention had the same characteristics as those in Example 1. The relative peak intensity ratio was 28.2%.

The silicoaluminophosphate after drying was analyzed by an inductively coupled plasma emission analyzer (ICP) and found to have the following composition in terms of oxide:

(Si$_{0.08}$Al$_{0.50}$P$_{0.42}$)O$_2$

The silicoaluminophosphate after drying was observed by SEM, and the average crystal size of arbitrary 150 crystals was 1.0 μm.

The intergrowth ratio of the obtained silicoaluminophosphate was 30/70 in terms of CHA/AEI.

Example 5

A reaction mixture having the following composition was prepared by mixing 29.4 g of water, 9.0 g of an aqueous 85% phosphoric acid solution (Kishida Chemical Co., Ltd.; guaranteed reagent), 1.5 g of 30% colloidal silica (Nissan Chemical Industries, Ltd.; ST-N30), 11.9 g of triethylamine (Kishida Chemical Co., Ltd.; guaranteed reagent), 5.2 g of 77% pseudo-boehmite (Sasol; Pural SB), and 0.07 g of a seed crystal prepared by wet milling the crystalline silicoaluminophosphate obtained in Example 1 in a ball mill for 1 hour.
P$_2$O$_5$/Al$_2$O$_3$=1.0
SiO$_2$/Al$_2$O$_3$=0 0.2
H$_2$O/Al$_2$O$_3$=50
TEA/Al$_2$O$_3$=3
Seed crystal: 0.6 wt %

This reaction mixture was put in a 80-mL stainless steel-made sealed pressure vessel and held at 180° C. for 62 hours while rotating the vessel around a horizontal axis at 55 rpm to obtain the silicoaluminophosphate of this Example.

The obtained silicoaluminophosphate was filtered, washed with water, dried at 110° C. overnight and then calcined at 600° C. for 2 hours to form a hydrogen type.

An XRD pattern of the resulting silicoaluminophosphate of a hydrogen type was obtained using an XRD apparatus (Mac Science; MPX3) employing a copper Kα ray as the ray source, and the interplanar spacing (d value) at a peak position and the relative intensity of the peak were determined therefrom and shown in Table 6 (in the Table, only diffraction peaks with a relative intensity of 2% or more are shown).

TABLE 6

| Interplanar Spacing Å | Relative Intensity I/I₀ | |
|---|---|---|
| 9.32 | 1000 | |
| 6.86 | 214 | |
| 6.61 | 20 | B |
| 5.52 | 149 | |
| 5.26 | 21 | B |
| 4.97 | 25 | |
| 4.65 | 29 | |
| 4.30 | 322 | |
| 4.18 | 29 | B |
| 3.84 | 36 | |
| 3.56 | 32 | |
| 3.43 | 77 | |
| 3.16 | 20 | |
| 2.91 | 60 | B |
| 2.87 | 102 | |
| 2.59 | 20 | |

B indicates a broad peak.

As shown in Table 6, the characteristics of the silicoaluminophosphate of the present invention had the same characteristics as those in Example 1. The relative peak intensity ratio was 6.5%.

The silicoaluminophosphate after drying was analyzed by an inductively coupled plasma emission analyzer (ICP) and found to have the following composition in terms of oxide:

(Si$_{0.06}$Al$_{0.50}$P$_{0.44}$)O$_2$

The silicoaluminophosphate after drying was observed by SEM, and the average crystal size of arbitrary 150 crystals was 2.7 μm.

The intergrowth ratio of the obtained silicoaluminophosphate was 45/55 in terms of CHA/AEI.

Example 6

A reaction mixture having the following composition was prepared by mixing 24.4 g of water, 8.7 g of an aqueous 85% phosphoric acid solution (Kishida Chemical Co., Ltd.; guaranteed reagent), 7.4 g of 30% colloidal silica (Nissan Chemical Industries, Ltd.; ST-N30), 11.5 g of triethylamine (Kishida Chemical Co., Ltd.; guaranteed reagent), 5.0 g of 77% pseudo-boehmite (Sasol; Pural SB), and 0.09 g of a seed crystal prepared by wet milling the silicoaluminophosphate obtained in Example 1 in a ball mill for 1 hour.
P$_2$O$_5$/Al$_2$O$_3$=1.0
SiO$_2$/Al$_2$O$_3$=1.0
H$_2$O/Al$_2$O$_3$=50
TEA/Al$_2$O$_3$=3
Seed crystal: 0.6 wt %

This reaction mixture was put in a 80-mL stainless steel-made sealed pressure vessel and held at 180° C. for 63 hours while rotating the vessel around a horizontal axis at 55 rpm to obtain the silicoaluminophosphate of this Example.

The obtained silicoaluminophosphate was filtered, washed with water, dried at 110° C. overnight and then calcined at 600° C. for 2 hours to form a hydrogen type.

An XRD pattern of the resulting silicoaluminophosphate of a hydrogen type was obtained using an XRD apparatus (Mac Science; MPX3) employing a copper Kα ray as the ray source, and the interplanar spacing (d value) at a peak position and the relative intensity of the peak were determined therefrom and shown in Table 7 (in the Table, only diffraction peaks with a relative intensity of 2% or more are shown).

TABLE 7

| Interplanar Spacing Å | Relative Intensity I/I$_0$ | |
| --- | --- | --- |
| 9.28 | 1000 | |
| 6.84 | 198 | |
| 6.60 | 21 | B |
| 5.49 | 134 | |
| 5.21 | 20 | B |
| 4.96 | 25 | |
| 4.63 | 33 | |
| 4.28 | 262 | |
| 4.16 | 29 | B |
| 3.82 | 43 | |
| 3.54 | 37 | |
| 3.41 | 70 | |
| 2.89 | 65 | |
| 2.86 | 80 | |

B indicates a broad peak.

As shown in Table 7, the characteristics of the silicoaluminophosphate of the present invention had the same characteristics as those in Example 1 (in the Table, only diffraction peaks with a relative intensity of 2% or more are shown). The relative peak intensity ratio was 7.6%.

The silicoaluminophosphate after drying was analyzed by an inductively coupled plasma emission analyzer (ICP) and found to have the following composition in terms of oxide:

$(Si_{0.10}Al_{0.49}P_{0.41})O_2$

The silicoaluminophosphate after drying was observed by SEM, and the average crystal size of arbitrary 150 crystals was 1.4 µm.

The intergrowth ratio of the obtained silicoaluminophosphate was 45/55 in terms of CHA/AEI.

Example 7

A reaction mixture having the following composition was prepared by mixing 26.9 g of water, 8.9 g of an aqueous 85% phosphoric acid solution (Kishida Chemical Co., Ltd.; guaranteed reagent), 4.5 g of 30% colloidal silica (Nissan Chemical Industries, Ltd.; ST-N30), 11.7 g of triethylamine (Kishida Chemical Co., Ltd.; guaranteed reagent), and 5.1 g of 77% pseudo-boehmite (Sasol; Pural SB).

$P_2O_5/Al_2O_3=1.0$
$SiO_2/Al_2O_3=0.6$
$H_2O/Al_2O_3=50$
$TEA/Al_2O_3=3$

This reaction mixture was put in a 80-mL stainless steel-made sealed pressure vessel and held at 200° C. for 62 hours while rotating the vessel around a horizontal axis at 55 rpm to obtain the silicoaluminophosphate of this Example.

The obtained silicoaluminophosphate was filtered, washed with water, dried at 110° C. overnight and then calcined at 600° C. for 2 hours to form a hydrogen type.

An XRD pattern of the resulting silicoaluminophosphate of a hydrogen type was obtained using an XRD apparatus (Mac Science; MPX3) employing a copper Kα ray as the ray source, and the interplanar spacing (d value) at a peak position and the relative intensity of the peak were determined therefrom and shown in Table 8 (in the Table, only diffraction peaks with a relative intensity of 2% or more are shown).

TABLE 8

| Interplanar Spacing Å | Relative Intensity I/I$_0$ | |
| --- | --- | --- |
| 9.30 | 1000 | |
| 6.86 | 108 | |
| 6.60 | 20 | B |
| 5.52 | 84 | |
| 5.24 | 35 | B |
| 4.66 | 29 | |
| 4.30 | 152 | |
| 4.17 | 43 | B |
| 3.84 | 15 | |
| 3.43 | 39 | |
| 2.93 | 27 | |
| 2.88 | 64 | |

B indicates a broad peak.

As shown in Table 8, the characteristics of the silicoaluminophosphate of the present invention had the same characteristics as those in Example 1. The relative peak intensity ratio was 23.0%.

The silicoaluminophosphate after drying was analyzed by an inductively coupled plasma emission analyzer (ICP) and found to have the following composition in terms of oxide:

$(Si_{0.09}Al_{0.49}P_{0.42})O_2$

The silicoaluminophosphate after drying was observed by SEM, and the average crystal size of arbitrary 150 crystals was 3.4 µm.

The intergrowth ratio of the obtained silicoaluminophosphate was 30/70 in terms of CHA/AEI.

Comparative Example 1

A reaction mixture having the following composition was prepared by mixing 26.9 g of water, 8.9 g of an aqueous 85% phosphoric acid solution (Kishida Chemical Co., Ltd.; guaranteed reagent), 4.5 g of 30% colloidal silica (Nissan Chemical Industries, Ltd.; ST-N30), 11.7 g of triethylamine (Kishida Chemical Co., Ltd.; guaranteed reagent), and 5.1 g of 77% pseudo-boehmite (Sasol; Pural SB).

$P_2O_5/Al_2O_3=1.0$
$SiO_2/Al_2O_3=0.6$
$H_2O/Al_2O_3=50$
$TEA/Al_2O_3=3$

This reaction mixture was put in a 80-mL stainless steel-made sealed pressure vessel and held at 160° C. for 92 hours while rotating the vessel around a horizontal axis at 55 rpm to obtain the silicoaluminophosphate of this Comparative Example.

The obtained silicoaluminophosphate was filtered, washed with water, dried at 110° C. overnight and then calcined at 600° C. for 2 hours to form a hydrogen type.

A powder X-ray diffraction pattern of the resulting silicoaluminophosphate of a hydrogen type was obtained using an XRD apparatus (Mac Science; MPX3) employing a copper Kα ray as the ray source, and the interplanar spacing (d value) at a peak position and the relative intensity of the peak were determined therefrom and shown in Table 9 (in the Table, only diffraction peaks with a relative intensity of 2% or more are shown).

TABLE 9

| Interplanar Spacing Å | Relative Intensity I/I$_0$ |
| --- | --- |
| 9.34 | 1000 |
| 6.88 | 84 |

TABLE 9-continued

| Interplanar Spacing Å | Relative Intensity I/I₀ | |
|---|---|---|
| 6.64 | 14 | B |
| 5.53 | 63 | |
| 5.23 | 6 | B |
| 4.66 | 21 | |
| 4.31 | 125 | |
| 4.18 | 18 | B |
| 3.85 | 13 | |
| 3.43 | 26 | |
| 2.93 | 32 | |
| 2.88 | 46 | |

B indicates a broad peak.

As shown in Table 9, in the silicoaluminophosphate of this Comparative Example, the broad peak at an interspacing of 5.23 Å was very small and unclear, and the relative peak intensity ratio was 4.8%.

The silicoaluminophosphate after drying was analyzed by an inductively coupled plasma emission analyzer (ICP) and found to have the following composition in terms of oxide:

$(Si_{0.09}Al_{0.53}P_{0.38})O_2$

The silicoaluminophosphate after drying was observed by SEM, and the average crystal size of arbitrary 150 crystals was 6.5 μm.

The intergrowth ratio of the obtained silicoaluminophosphate was 55/45 in terms of CHA/AEI.

Comparative Example 2

A reaction mixture having the following composition was prepared by mixing 244 g of water, 279 g of an aqueous 85% phosphoric acid solution (Kishida Chemical Co., Ltd.; guaranteed reagent), 135 g of 30% colloidal silica (Nissan Chemical Industries, Ltd.; ST-N30), 1,159 g of 35% tetraethylammonium hydroxide (Alfa Aesar), and 183 g of 77% pseudo-boehmite (Sasol; Pural SB).

$P_2O_5/Al_2O_3=0.88$
$SiO_2/Al_2O_3=0.5$
$H_2O/Al_2O_3=50$
$TEAOH/Al_2O_3=2$
(TEAOH represents tetraethylammonium hydroxide.)

This reaction mixture was put in a 4,000-mL stainless steel-made sealed pressure vessel and held at 200° C. for 92 hours with stirring at 270 rpm to obtain the silicoaluminophosphate of this Comparative Example.

The obtained silicoaluminophosphate was filtered, washed with water, dried at 110° C. overnight and then calcined at 600° C. for 2 hours to form a hydrogen type.

An XRD pattern of the resulting silicoaluminophosphate of a hydrogen type was obtained using an XRD apparatus (Mac Science; MPX3) employing a copper Kα ray as the ray source, and the interplanar spacing (d value) at a peak position and the relative intensity of the peak were determined therefrom and shown in Table 10 (in the Table, only diffraction peaks with a relative intensity of 2% or more are shown).

TABLE 10

| Interplanar Spacing Å | Relative Intensity I/I₀ |
|---|---|
| 9.34 | 1000 |
| 6.88 | 272 |
| 5.53 | 157 |

TABLE 10-continued

| Interplanar Spacing Å | Relative Intensity I/I₀ |
|---|---|
| 4.98 | 78 |
| 4.66 | 24 |
| 4.30 | 405 |
| 3.85 | 46 |
| 3.56 | 83 |
| 3.43 | 88 |
| 3.16 | 21 |
| 2.92 | 181 |
| 2.88 | 124 |
| 2.60 | 23 |

As shown in Table 10, the XRD pattern of this Comparative Example had the interplanar spacing-relative intensity characteristics of SAPO-34. Therefore, the product did not have all of the peaks at an interplanar spacing of 6.60 Å, an interplanar spacing of 5.24 Å and an interplanar spacing of 4.17 Å, and the relative peak intensity ratio was 0%.

The silicoaluminophosphate after drying was analyzed by an inductively coupled plasma emission analyzer (ICP) and found to have the following composition in terms of oxide:

$(Si_{0.12}Al_{0.49}P_{0.39})O_2$

The silicoaluminophosphate after drying was observed by SEM, and the average crystal size of arbitrary 150 crystals was 0.8 μm.

The intergrowth ratio of the obtained silicoaluminophosphate was 90/10 in terms of CHA/AEI.

Comparative Example 3

A reaction mixture having the following composition was prepared by mixing 7.6 g of water, 9.0 g of an aqueous 85% phosphoric acid solution (Kishida Chemical Co., Ltd.; guaranteed reagent), 2.3 g of 30% colloidal silica (Nissan Chemical Industries, Ltd.; ST-N30), 32.9 g of 35% tetraethylammonium hydroxide (Alfa Aesar), and 5.2 g of 77% pseudo-boehmite (Sasol; Pural SB).

$P_2O_5/Al_2O_3=1.0$
$SiO_2/Al_2O_3=0.3$
$H_2O/Al_2O_3=50$
$TEAOH/Al_2O_3=2$
(TEAOH represents tetraethylammonium hydroxide.)

This reaction mixture was put in a 80-mL stainless steel-made sealed pressure vessel and held at 200° C. for 88 hours while rotating the vessel around a horizontal axis at 55 rpm to obtain the silicoaluminophosphate of this Comparative Example.

The obtained silicoaluminophosphate was filtered, washed with water, dried at 110° C. overnight and then calcined at 600° C. for 2 hours to form a hydrogen type.

An XRD pattern of the resulting silicoaluminophosphate of a hydrogen type was obtained using an XRD apparatus (Mac Science; MPX3) employing a copper Kα ray as the ray source, and the interplanar spacing (d value) at a peak position and the relative intensity of the peak were determined therefrom and shown in Table 11 (in the Table, only diffraction peaks with a relative intensity of 2% or more are shown).

TABLE 11

| Interplanar Spacing Å | Relative Intensity I/I₀ |
|---|---|
| 9.30 | 1000 |
| 6.84 | 282 |

TABLE 11-continued

| Interplanar Spacing Å | Relative Intensity I/I$_0$ |
|---|---|
| 5.50 | 165 |
| 4.96 | 88 |
| 4.63 | 34 |
| 4.28 | 435 |
| 3.83 | 62 |
| 3.55 | 104 |
| 3.42 | 106 |
| 3.15 | 31 |
| 2.90 | 223 |
| 2.86 | 137 |
| 2.82 | 24 |
| 2.58 | 25 |

As shown in Table 11, the pattern had the interplanar spacing-relative intensity characteristics of SAPO-34. Therefore, the product did not have all of the peaks at an interplanar spacing of 6.60 Å, an interplanar spacing of 5.24 Å and an interplanar spacing of 4.17 Å, and the relative peak intensity ratio was 0%.

The silicoaluminophosphate after drying was analyzed by an inductively coupled plasma emission analyzer (ICP) and found to have the following composition in terms of oxide:

$$(Si_{0.08}Al_{0.51}P_{0.40})O_2$$

The silicoaluminophosphate after drying was observed by SEM, and the average crystal size of arbitrary 150 crystals was 0.6 µm.

The intergrowth ratio of the obtained silicoaluminophosphate was 90/10 in terms of CHA/AEI.

Comparative Example 4

A reaction mixture having the following composition was prepared by mixing 30.8 g of water, 7.9 g of an aqueous 85% phosphoric acid solution (Kishida Chemical Co., Ltd.; guaranteed reagent), 5.0 g of 30% colloidal silica (Nissan Chemical Industries, Ltd.; ST-N30), 7.6 g of morpholine (Kishida Chemical Co., Ltd.; guaranteed reagent), and 5.7 g of 77% pseudo-boehmite (Sasol; Pural SB).

P$_2$O$_5$/Al$_2$O$_3$=0.8
SiO$_2$/Al$_2$O$_3$=0.6
H$_2$O/Al$_2$O$_3$=50
morpholine/Al$_2$O$_3$=2

This reaction mixture was put in a 80-mL stainless steel-made sealed pressure vessel and held at 180° C. for 63 hours while rotating the vessel around a horizontal axis at 55 rpm to obtain the silicoaluminophosphate of this Comparative Example.

The obtained silicoaluminophosphate was filtered, washed with water, dried at 110° C. overnight and then calcined at 600° C. for 2 hours to form a hydrogen type.

A powder X-ray diffraction pattern of the resulting silicoaluminophosphate of a hydrogen type was obtained using an XRD apparatus (Mac Science; MPX3) employing a copper Kα ray as the ray source, and the interplanar spacing (d value) at a peak position and the relative intensity of the peak were determined therefrom and shown in Table 12 (in the Table, only diffraction peaks with a relative intensity of 2% or more are shown).

TABLE 12

| Interplanar Spacing Å | Relative Intensity I/I$_0$ |
|---|---|
| 9.30 | 1000 |
| 6.83 | 343 |
| 6.32 | 28 |
| 5.49 | 152 |
| 4.97 | 231 |
| 4.62 | 38 |
| 4.27 | 530 |
| 4.01 | 24 |
| 3.82 | 76 |
| 3.54 | 236 |
| 3.40 | 128 |
| 3.19 | 23 |
| 3.14 | 51 |
| 2.89 | 275 |
| 2.85 | 135 |
| 2.57 | 33 |

As shown in Table 12, the pattern had the interplanar spacing-relative intensity characteristics of SAPO-34. Therefore, the product did not have all of the peaks at an interplanar spacing of 6.60 Å, an interplanar spacing of 5.24 Å and an interplanar spacing of 4.17 Å, and the relative peak intensity ratio was 0%.

The silicoaluminophosphate after drying was analyzed by an inductively coupled plasma emission analyzer (ICP) and found to have the following composition in terms of oxide:

$$(Si_{0.12}Al_{0.50}P_{0.39})O_2$$

The silicoaluminophosphate after drying was observed by SEM, and the average crystal size of arbitrary 150 crystals was 15 µm.

The intergrowth ratio of the obtained silicoaluminophosphate was 100/0 in terms of CHA/AEI.

Comparative Example 5

A reaction mixture having the following composition was prepared by mixing 64.3 g of water, 18.3 g of an aqueous 85% phosphoric acid solution (Kishida Chemical Co., Ltd.; guaranteed reagent), 6.9 g of 30% colloidal silica (Nissan Chemical Industries, Ltd.; ST-N30), 18.8 g of N-ethyldiisopropylamine (Kishida Chemical Co., Ltd.; guaranteed reagent), and 11.7 g of 77% pseudo-boehmite (Sasol; Pural SB).

P$_2$O$_5$/Al$_2$O$_3$=0.9
SiO$_2$/Al$_2$O$_3$=0.4
H$_2$O/Al$_2$O$_3$=50
EDIPA/Al$_2$O$_3$=1.6
(EDIPA represents N-ethyldiisopropylamine.)

This reaction mixture was put in a 80-mL stainless steel-made sealed pressure vessel and held at 160° C. for 91 hours while rotating the vessel around a horizontal axis at 55 rpm to obtain the silicoaluminophosphate of this Comparative Example.

The obtained silicoaluminophosphate was filtered, washed with water, dried at 110° C. overnight and then calcined at 600° C. for 2 hours to form a hydrogen type.

An XRD pattern of the resulting silicoaluminophosphate of a hydrogen type was obtained using an XRD apparatus (Mac Science; MPX3) employing a copper Kα ray as the ray source, and the interplanar spacing (d value) at a peak position and the relative intensity of the peak were determined therefrom and shown in Table 13 (in the Table, only diffraction peaks with a relative intensity of 2% or more are shown).

TABLE 13

| Interplanar Spacing Å | Relative Intensity I/I₀ |
|---|---|
| 9.32 | 1000 |
| 8.34 | 206 |
| 6.84 | 138 |
| 6.58 | 51 |
| 5.51 | 130 |
| 5.24 | 243 |
| 5.16 | 199 |
| 4.66 | 37 |
| 4.52 | 37 |
| 4.43 | 66 |
| 4.30 | 141 |
| 4.16 | 134 |
| 3.72 | 178 |
| 3.43 | 51 |
| 3.39 | 73 |
| 3.21 | 69 |
| 2.98 | 37 |
| 2.94 | 42 |
| 2.87 | 109 |
| 2.78 | 59 |
| 2.74 | 38 |

As shown in Table 13, the pattern had the interplanar spacing-relative intensity characteristics of SAPO-18. In addition, the product did not have a peak corresponding to an interplanar spacing of 3.82 Å, the peak corresponding to an interplanar spacing of 5.24 Å was a sharp peak, and the relative peak intensity ratio was 172.3%.

The silicoaluminophosphate after drying was analyzed by an inductively coupled plasma emission analyzer (ICP) and found to have the following composition in terms of oxide:

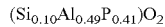
$(Si_{0.10}Al_{0.49}P_{0.41})O_2$

The silicoaluminophosphate after drying was observed by SEM, as a result, although an exact crystal size was not measured due to non-uniform crystal shape (from columnar to plate-like), the crystal size in the long-side direction was almost 1 μm or less.

The intergrowth ratio of the obtained silicoaluminophosphate was 0/100 in terms of CHA/AEI.

Measurement Example

Evaluation of Water Resistance

Each of the silicoaluminophosphates synthesized in Examples 1 to 7 and Comparative Example 1, SAPO-34 synthesized in Comparative Examples 2 to 4, and SAPO-18 synthesized in Comparative Example 5 was calcined at 600° C. for 2 hours to remove the structure directing agent and form a hydrogen type. Thereafter, 0.5 g of the hydrogen type sample was spread in a petri dish and stored in saturated water vapor at 80° C. for 8 days, and the solid acidity before and after the storage were compared. In addition, the same water resistance evaluation was performed on two kinds of commercially available SAPO-34. The results are shown together in Table 14.

TABLE 14

| | Solid Acidity mmol/g | | Acidity |
|---|---|---|---|
| | Initial | After 8 Days | Retention % |
| Example 1 | 0.91 | 0.63 | 69 |
| Example 2 | 0.65 | 0.46 | 71 |
| Example 3 | 0.80 | 0.51 | 64 |
| Example 4 | 0.86 | 0.54 | 63 |
| Example 5 | 0.78 | 0.54 | 70 |
| Example 6 | 1.08 | 0.66 | 61 |
| Example 7 | 0.98 | 0.62 | 62 |
| Comparative Example 1 | 1.02 | 0.32 | 32 |
| Comparative Example 2 | 1.15 | 0.42 | 36 |
| Comparative Example 3 | 0.99 | 0.44 | 44 |
| Comparative Example 4 | 1.12 | 0.04 | 4 |
| Comparative Example 5 | 0.33 | 0.15 | 45 |
| Commercial Product 1 | 1.53 | 0.00 | 0 |
| Commercial Product 2 | 1.43 | 0.00 | 0 |

As apparent from Table 14, in all of the silicoaluminophosphates of the present invention, the initial solid acidity is as large as 0.5 mmol/g or more by virtue of their XRD patterns and compositions. In addition, even after storage in saturated water vapor at 80° C. for 8 days, a solid acidity of at least 50%, furthermore, 60% or more, is retained. Thus, those silicoaluminophosphates have a high acidity retention percentage, i.e., high water resistance, compared with SAPO-18 and SAPO-34.

INDUSTRIAL APPLICABILITY

The silicoaluminophosphate of the present invention has high water resistance as above and therefore, can be used as a solid acid catalyst, etc.

All contents of the descriptions, claims, drawings and abstracts of Japanese Patent Application No. 2012-119091 filed on May 24, 2012, Japanese Patent Application No. 2012-135093 filed on Jun. 14, 2012, and Japanese Patent Application No. 2012-281674 filed on Dec. 25, 2012 are cited herein by way of reference and incorporated as the disclosure in the description of the present invention.

The invention claimed is:

1. A silicoaluminophosphate represented by the following formula (1) having a powder X-ray diffraction pattern shown in Table 1 below, and a crystal in which an intergrowth ratio of CHA structure and AEI structure is from 50/50 to 30/70 in terms of CHA/AEI ratio:

$(Si_xAl_yP_z)O_2$     (1)

wherein x is a molar fraction of Si and $0.05 \leq x \leq 0.15$;
y is a molar fraction of Al and $0.47 \leq y \leq 0.52$;
z is a molar fraction of P and $0.40 \leq z \leq 0.46$; and
$x+y+z=1$;

TABLE 1

| Interplanar Spacing Å | Relative Intensity I/I₀ | |
|---|---|---|
| 9.30 ± 0.15 | 1000 | |
| 6.85 ± 0.10 | from 100 to 300 | |
| 6.60 ± 0.10 | from 10 to 100 | B |
| 5.50 ± 0.10 | from 50 to 300 | |
| 5.24 ± 0.10 | from 10 to 100 | B |
| 4.64 ± 0.10 | from 10 to 100 | |
| 4.29 ± 0.05 | from 100 to 500 | |
| 4.17 ± 0.05 | from 10 to 150 | B |
| 3.82 ± 0.05 | from 10 to 100 | |
| 3.42 ± 0.05 | from 20 to 150 | |
| 2.87 ± 0.02 | from 20 to 200 | |

I/I₀ is a relative intensity when the peak of 9.30 ± 0.15 Å is taken as 1,000; and B indicates a broad peak.

2. The silicoaluminophosphate according to claim 1, wherein an average crystal size is from 0.5 to 10 μm.

3. The silicoaluminophosphate according to claim 1, wherein a solid acidity of a crystal is 0.5 mmol/g or more.

4. The silicoaluminophosphate according to claim 1, wherein a solid acidity of at least 50% is retained after a crystal in a hydrogen-type state resulting from removal of a structure directing agent is stored in saturated water vapor at 80° C. for 8 days.

5. A method for producing the silicoaluminophosphate according to claim 1, comprising:

mixing a silicon source, a phosphorus source, an aluminum source, water and a structure directing agent to prepare a reaction mixture having, when expressed by molar ratios of oxides, the following molar compositional ratio:

| | |
|---|---|
| $P_2O_5/Al_2O_3$ | from 0.7 to 1.5, |
| $SiO_2/Al_2O_3$ | from 0.1 to 1.2, |
| $H_2O/Al_2O_3$ | from 5 to 100, and |
| $R/Al_2O_3$ | from 0.5 to 5 | in which R represents a structure directing agent; and holding the reaction mixture at a temperature of from more than 160° C. to 220° C. for 5 to 100 hours, wherein the structure directing agent is triethylamine or a mixture of triethylamine and other alkylamine or an ammonium salt thereof.

6. The method for producing the silicoaluminophosphate, wherein the silicoaluminophosphate according to claim 1 is added as a seed crystal to the reaction mixture in a ratio of 0.05 to 10 wt % relative to a total weight of the silicon source, the phosphorus source and the aluminum source in the reaction mixture when the amounts are converted in terms of oxides ($SiO_2$, $P_2O_5$, $Al_2O_3$), wherein the reaction mixture having, when expressed by molar ratios of oxides, the following molar compositional ratio:

$P_2O_5/Al_2O_3$ from 0.7 to 1.5, $SiO_2/Al_2O_3$ from 0.1 to 1.2, $H_2O/Al_2O_3$ from 5 to 100, and $R/Al_2O_3$ from 0.5 to 5 in which R represents a structure directing agent, wherein the structure directing agent is triethylamine or a mixture of triethylamine and other alkylamine or an ammonium salt thereof.

7. A solid acid catalyst, comprising:

the silicoaluminophosphate according to claim 1.

* * * * *